UNITED STATES PATENT OFFICE.

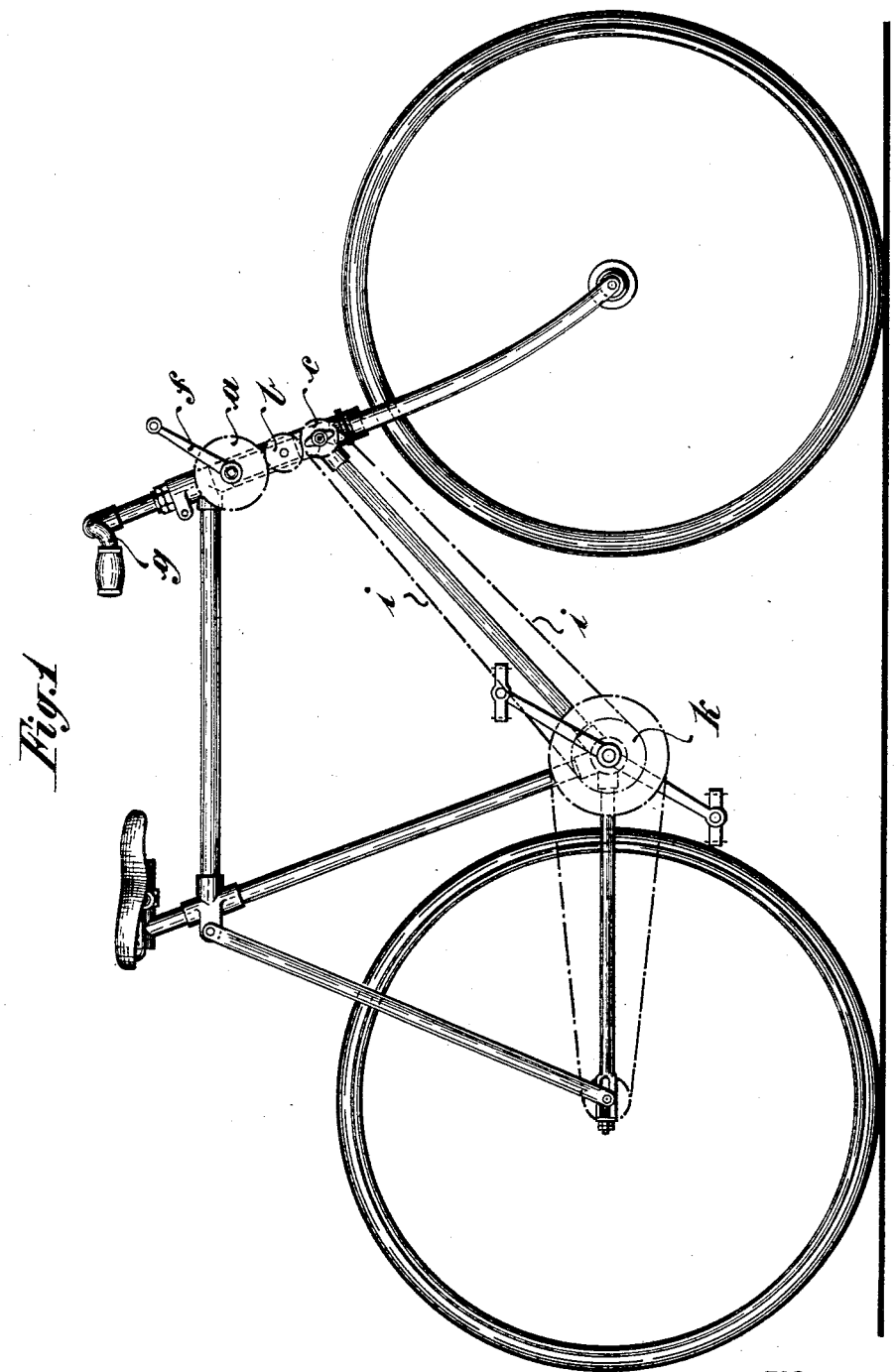

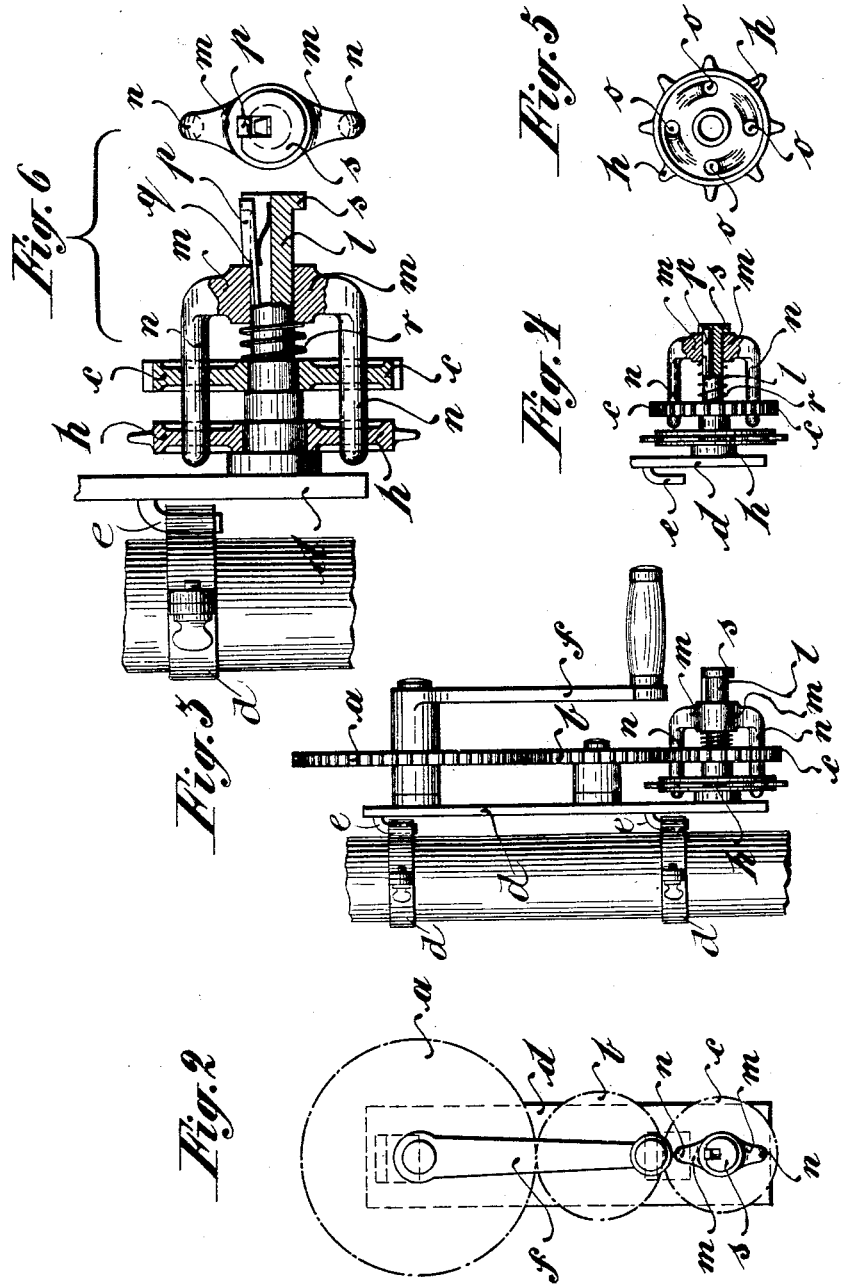

KARL WUNNER, OF REGENSBURG, GERMANY.

AUXILIARY HAND-OPERATED DRIVING MECHANISM FOR BICYCLES.

SPECIFICATION forming part of Letters Patent No. 704,284, dated July 8, 1902.

Application filed June 19, 1901. Serial No. 65,113. (No model.)

*To all whom it may concern:*

Be it known that I, KARL WUNNER, a subject of the King of Bavaria, residing at Regensburg, in the Kingdom of Bavaria, German Empire, have invented certain new and useful Improvements in Auxiliary Hand-Operated Driving Mechanisms for Bicycles, of which the following is a specification.

The invention relates to an auxiliary driving-gear mechanism for bicycles which is adapted to be readily thrown into operation, so that the propulsion of the bicycle is accomplished either by combined hand and foot power or by foot-power only.

The object of the invention is to provide means whereby the auxiliary driving-gear mechanism can be thrown into engagement with the pedal mechanism while the bicycle is in motion.

To this end the invention consists of an auxiliary driving-gear mechanism for bicycles which comprises a train of gear-wheels mounted upon a suitable support secured to the head of the bicycle-frame, a crank for operating the gear-wheels, a shaft of one of said wheels having a sprocket loosely mounted thereon, a dog on said shaft for connecting the sprocket with said wheel, and a spring-actuated key in said shaft for keeping the dog in operative relationship with the sprocket and arranged and operated in a manner which will be more fully described hereinafter and finally pointed out in the claims, reference being had to the accompanying drawings, in which—

Figure 1 is a side view of a bicycle with the invention attached. Fig. 2 is an elevation of the mechanism that is attached to the head of the bicycle-frame. Fig. 3 is a side view of said mechanism being attached to the head of the bicycle-frame, which latter is shown in part. Figs. 4, 5, and 6 are detail views of parts of said mechanism, Fig. 6 being drawn on a large scale and showing part of the head of the bicycle-frame.

Similar letters of reference indicate corresponding parts.

Referring to the drawings, $a$, $b$, and $c$ are gear-wheels arranged as a train and mounted on the plate $d$, which is secured to the head of the bicycle-frame by means of the hooks $e$, which engage in any suitable means provided on the frame for securing the plate, such as the clips $d'$. (Shown clearly in Fig. 3.) The plate $d$ is secured to the head of the bicycle-frame at a suitable distance below the handle-bar $g$, so that the crank $f$ for imparting motion to the wheels can be operated conveniently. Loosely mounted upon the shaft $l$ of the lower gear-wheel $c$ is the sprocket $h$, which connects, by means of the chain $i$, with the sprocket $k$, adjacent the crank-sprocket of the foot driving-gear.

The shaft $l$ extends out beyond the wheel $c$ and carries the spring-actuated dog $m$, which is provided with the arms $n$, projecting inwardly through the wheel $c$. The dog $m$ is maintained in outward position, abutting against the shoulder $s$, by the spring $r$ on the shaft $l$ between the dog and the wheel $c$. The wheel $h$ is provided with openings $o$, which are diametrically arranged and adapted to engage the ends of arms $n$ of the dog when it is desired to throw the hand driving mechanism into engagement with the foot driving mechanism. In order to keep the dog in engagement with the sprocket, the key $p$ is provided in a longitudinal groove in the shaft $l$ and is under outward spring tension. When the dog is pressed inwardly against the spring $r$ and the arms pass through the openings $o$, the key $p$ springs out from the groove of the shaft and locks the dog in such position by means of the shoulder $q$.

In operation the mechanism is used as follows: When it is desired to use hand-power in addition to the foot-power, as in the case of hill-climbing, the dog is pushed inwardly by one hand until the arms of the dog enter the openings in the sprocket, whereby the key locks the dog in such position, while the other hand is used for guiding the bicycle. In this relation of the parts the hand-power is transmitted by the crank gear-wheels, sprocket, and chain to the foot driving mechanism. When it is desired to disengage the hand driving-gear, the key is depressed and the dog is forced back to its normal position by the compression-spring, as described. By this simple arrangement the hand driving-gear of the bicycle can be readily and conveniently thrown into coöperation with the foot driving-gear while the bicycle is in motion, so that additional power can be used, as for climbing hills, for increasing speed, or relieving the legs when fatigued, by propelling the bicycle by hand.

Having thus described my invention, I claim as new and desire to secure by Letters Patent—

1. In the combination, of an auxiliary hand driving-gear mechanism, with the driving-gear of a bicycle, comprising a plurality of gear-wheels mounted upon a supporting-plate, means for securing the same to the head of the bicycle-frame, a crank for operating said gear-wheels, a sprocket-wheel loosely supported on the shaft of the lower of said gear-wheels, a spring-actuated dog mounted on said shaft and adapted to connect said sprocket with said gear-wheel, and means for locking said dog in engagement with said sprocket, substantially as set forth.

2. In the combination, of an auxiliary hand driving-gear mechanism, with the driving-gear of a bicycle, comprising a plurality of gear-wheels mounted upon a supporting-plate, means for securing the same to the head of the bicycle-frame, a crank for operating said gear-wheels, a sprocket-wheel loosely supported on the shaft of the lower of said gear-wheels, a longitudinal slot in the outer end of said shaft, a spring-actuated dog mounted on said shaft having arms extending inwardly through said gear-wheel and adapted to engage diametrically-arranged openings in said sprocket, and a spring-actuated key secured in slot of said shaft and having a shoulder engaging the dog, substantially as set forth.

In witness whereof I have hereunto set my hand in presence of two witnesses.

KARL WUNNER.

Witnesses:
T. OBERNDORF,
M. FORNOE.